United States Patent [19]
Nishiya et al.

[11] Patent Number: 5,265,222
[45] Date of Patent: Nov. 23, 1993

[54] SYMBOLIZATION APPARATUS AND PROCESS CONTROL SYSTEM AND CONTROL SUPPORT SYSTEM USING THE SAME APPARATUS

[75] Inventors: Takushi Nishiya, Machida; Motohisa Funabashi; Hiromitsu Kurisu, both of Sagamihara; Mikio Yoda, Ibaraki; Kazuo Kera, Hitachi, all of Japan

[73] Assignee: Hitachi, Ltd., Tokyo, Japan

[21] Appl. No.: 617,347

[22] Filed: Nov. 23, 1990

[30] Foreign Application Priority Data

Nov. 27, 1989 [JP] Japan ................................. 1-304899

[51] Int. Cl.$^5$ ...................... G06F 15/18; G06F 15/46; G05B 19/06
[52] U.S. Cl. ............................................. 395/3; 395/51; 395/900; 395/22; 395/906
[58] Field of Search ................. 364/513, 807; 395/900, 395/3, 22

[56] References Cited

U.S. PATENT DOCUMENTS

| | | | |
|---|---|---|---|
| 4,837,725 | 6/1989 | Yamakawa | 364/807 |
| 4,875,184 | 10/1989 | Yamakawa | 364/807 |
| 4,907,167 | 3/1990 | Sheirik | 364/500 |
| 4,985,824 | 1/1991 | Husseiny et al. | 364/187 |
| 5,025,499 | 6/1991 | Inoue et al. | 364/165 |

OTHER PUBLICATIONS

Pourboghrat et al., "Neural Network Models for the Learning Control of Dynamical Systems with Application to Robotics", Lecture Notes in Control, Springer-Verlag, 1989, pp. 50–60.
Narendra et al., "Identification and Control of Dynamical Systems Using Neural Networks", IEEE Trans. Neural Networks, vol. 1(1), Mar. 1990, pp. 4–27.
Morita, A., "A Neural-Network Type Fuzzy Model", Mitsubishi Electric Advance, Jun. 1990, pp. T Rpts.
Psaltis et al., "A Multilayer Neural Network Controller", IEEE Control Systems Mag., Apr. 1988, pp. 17–21.
Mamdani et al., "Process Control Using Fuzzy Logic", Fuzzy Sets-Theory and Applications to Policy Analysis and Information Systems, Plenum, 1980, pp. 249–265.
Waller, L., "Fuzzy Logic Microprocessor Tackles Real-Time Tasks", Electronic Design, Feb. 9, 1989, p. 25.
van Nauta Lemke et al., "Fuzzy PID Supervisor", 24th IEEE Conf. Decision Control, Dec. 1985, pp. 602–608.
Procyk and Mamdani, "A Linguistic Self-Organizing Process Controller", Automatica vol. 15, 1979, 15–30.
Hayashi et al., "Neural Network Driven Fuzzy Reasoning Model", Proc. 28th SICE Annual Conf., 1989, 1343–1346.
Tacker et al., "A Fuzzy Logic/Neural System Approach to Signal Processing in Large Scale Decision Systems", 1989 Conf. on Syst., Man and Cybernetics, v. 3, Nov. 1989, 1094–1097.

*Primary Examiner*—Allen R. MacDonald
*Assistant Examiner*—Robert W. Downs
*Attorney, Agent, or Firm*—Antonelli, Terry, Stout & Kraus

[57] ABSTRACT

A symbolization apparatus which includes a membership function memory unit for storing a membership function used in fuzzy logic processing. In the symbolization apparatus a process condition change pattern is converted into an ambiguous symbol in order to build up a system capable of effecting an inference and decision approximate to a skilled operator against an object process. A process condition value memory is disclosed for holding a measurement of the process condition value and a process operation amount, a control history memory unit for storing operations and values converted into symbolic expressions, control units and a knowledge base for storing the information relating to the casual relations between the process control values and the process conditions. The process control system and a control support system comprise the function of condition identification approximate to that of a skilled operator by the use of the symbolization apparatus.

7 Claims, 15 Drawing Sheets

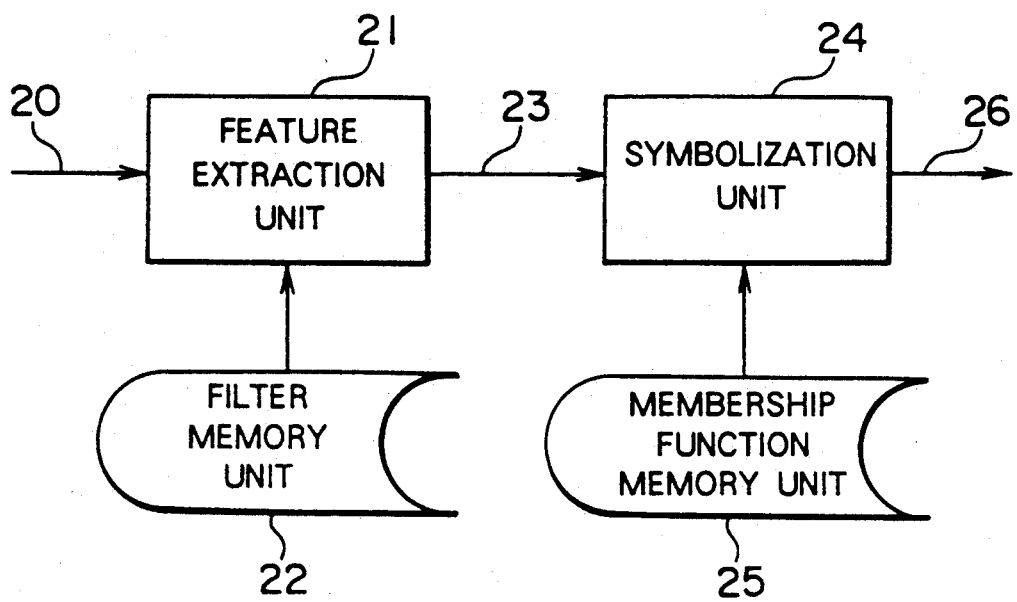
FIG. 2
FIG. 3A
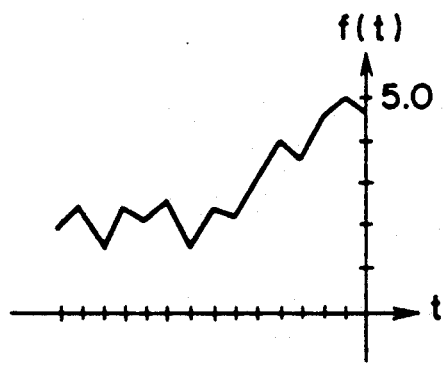
FIG. 3B
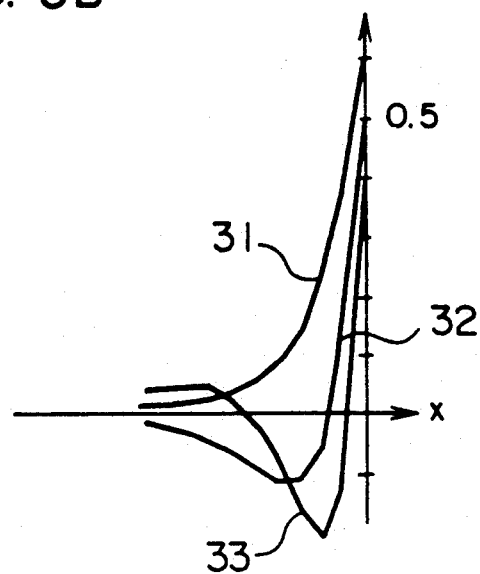
FIG. 3C
| ZERO-ORDER | 4.0 |
|---|---|
| PRIMARY | 0.5 |
| SECONDARY | 0.3 |

FIG. 4A
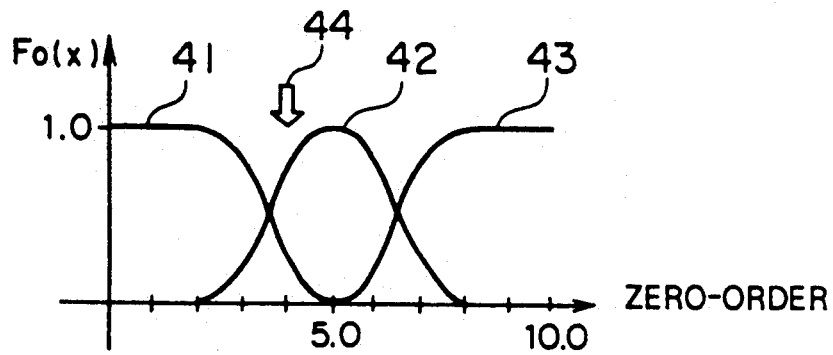
FIG. 4B
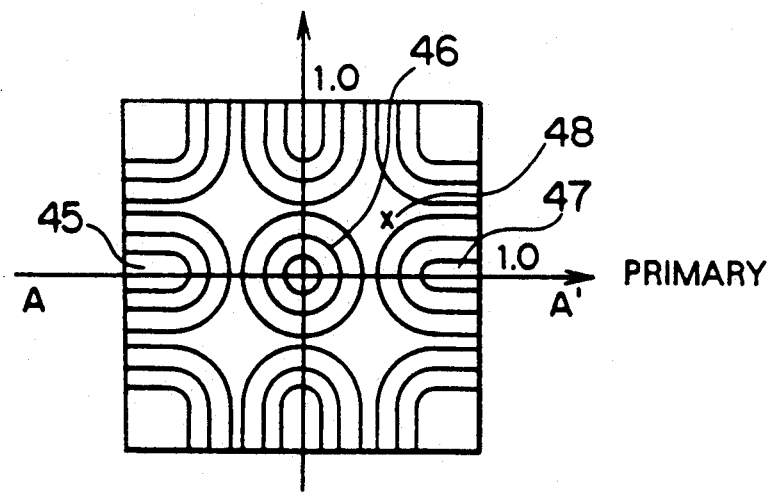
FIG. 4C
| HIGH | 0.0 |
| --- | --- |
| MEDIUM | 0.8 |
| LOW | 0.2 |
FIG. 4D
| UP | 0.5 |
| --- | --- |
| BALANCED | 0.2 |
| INCREASING FROM BALANCE | 0.3 |
| ⋮ | ⋮ |
| DOWN REVERSED FROM UP | 0.0 |

F I G. 6
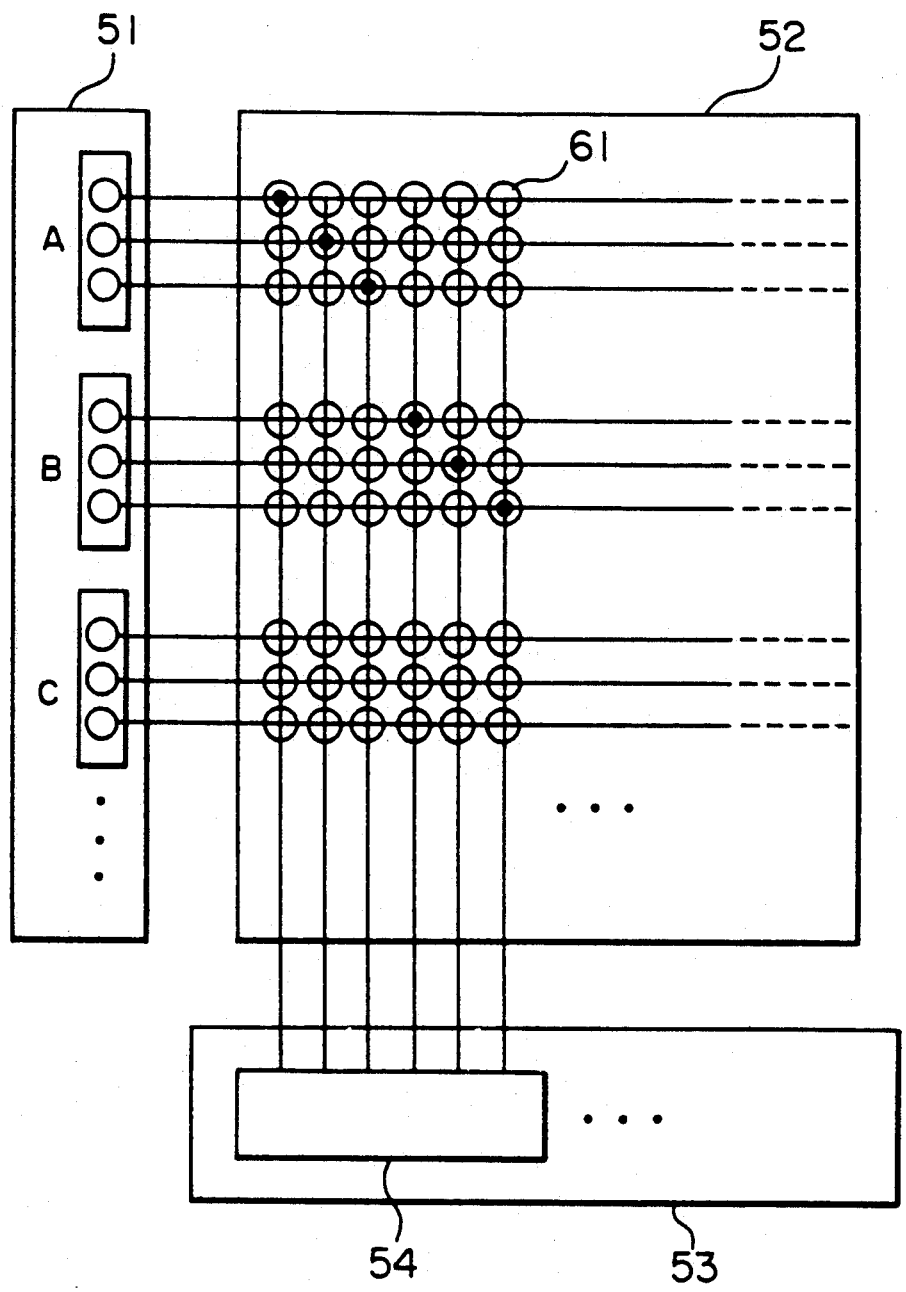

FIG. 7

CAUSAL KNOWLEDGE

```
(DATA A, DATA B) → DATA X
              ·
              ·
              ·
```

CONTROL KNOWLEDGE

```
IF    ( DATA A IS "UP" AND
        DATA B IS "HIGH" )

THEN ( "INCREASE" THE OPERATION
        AMOUNT X )
              ·
              ·
              ·
```

FIG. 16

CAUSAL KNOWLEDGE

① IF    ( PUMP WELL WATER LEVEL HIGH )
  THEN  ( RESERVOIR WATER MUCH )

② IF    ( PUMP WELL WATER LEVEL CHANGE
         RATE HIGH AND TOTAL DISCHARGE LARGE )
  THEN  ( INFLUX RATE HIGH )

③ IF    ( RAINFALL LARGE )
  THEN  ( INFLUX RATE INCREASED )

④ IF    ( RAINFALL CHANGE RATE HIGH )
  THEN  ( INFLUX RATE INCREASED )

CONTROL KNOWLEDGE

① IF    ( RESERVOIR WATER MUCH AND INFLUX
         RATE HIGH )
  THEN  ( PUMP QUANTITY INCREASED )

② IF    ( RESERVOIR WATER MUCH
         AND INFLUX CHANGE RATE HIGH )
  THEN  ( PUMP QUANTITY INCREASED )

③ IF    ( RESERVOIR WATER MUCH
         AND INFLUX RATE HIGH )
  THEN  ( WATER CHECK DOOR OPENING REDUCED )

④ IF    ( RESERVOIR WATER MUCH
         AND INFLUX CHANGE RATE HIGH )
  THEN  ( WATER CHECK DOOR OPENING REDUCED )

SYMBOLIZATION APPARATUS AND PROCESS CONTROL SYSTEM AND CONTROL SUPPORT SYSTEM USING THE SAME APPARATUS

BACKGROUND OF THE INVENTION

The present invention relates to a process control system and a control support system using the same process control system. In particular the present invention relates to a process control system and a control support system for controlling or managing complicated processes typically found in the heat process for iron and steel making furnaces or the like, the reaction process for chemical plants or the process of injecting chemicals in the water service system, and further in the processes subjected to a sharp change in control amount such as the sump pump for sewage disposal.

In recent years, a system for measuring and controlling the conditions has been employed in many manufacturing processes and processes for controlling the public resources like the water service and sewage disposal. Typical cases include the PID control based on the error between the process conditions and a target value and an application technique for artificial intelligence in which a process operating amount is determined by inference according to an "if~then~" rule using the process condition amounts.

The PID control is effective in an application having a small number of measurement information on the process. This control, however, is difficult to apply in a case involving a large number of measurement information and complicated causal relationship between the measurement information. In a technique for making inference according to the "if~then~" rule, it is necessary to extract the knowhow based on the knowledge and experience of a highly skilled operator in order to build up a rule. Not only is this difficult to carry out in a; complicated process but also a trial-and-error process for the work is required in order to maintain the consistency between the different rules.

As a solution, to this problem, the present applicants propose in Japanese patent application un-examined publication No. JP-A-02-85975, a control system characterized in that features are extracted from a condition change pattern in time series and are converted into an abstract expression while using the causal relationship between pieces of the measurement information obtained by the abstract expression. This control system realizes a stabilized control overcoming various disturbances of steady process conditions accounting for a great proportion of the operating period.

Even in the above-mentioned systems, however, unsteady process conditions or sudden abnormal states have yet to be met appropriately and the control operation for restitution is required to be performed manually by human labor. The subject of introducing a system concept to this area of manual operation is considered capable of being effectively solved by employing recent achievements of technical development in applications of artificial intelligence and data analysis techniques. An application of the above-mentioned techniques to the control of an unsteady process, however, encounters the two problems mentioned below.

In the first place, it is difficult to systematize the condition identification unit representing an important element of knowhow based on the knowledge and experiences of a skilled operator. The information used by a skilled operator in the control operataion includes, in addition to the normal measurement information, the recognition of "patterns of condition change in the progress of time", "patterns of combined conditions on a plurality of measurement data", "patterns of sound, image, ambience, etc." and combinations thereof. Further, a skilled operator makes a series of decisions based on such additional factors as the non-linearity and ambiguity of this information.

In the second place, it is not an easy matter to extract a rule on the inference and decision approximate to that of a skilled operator. This problem poses a great problem in building an expert system apparently for the following reasons. A skilled worker rarely recognizes his knowledge as a definite rule. It is impossible to extract the knowledge relating to special situations not experienced by an expert.

These two reasons also apply directly to the extraction of a rule for process control.

As an effective method of rule extraction, which is also a task in applications of artifical intelligence, a unique approach is based on the of structural characteristics of an object process in the case involving the process control.

SUMMARY OF THE INVENTION

A first object of the present invention, is to obviate the above-mentioned problems of the prior art. This is accomplished by providing a symbolization apparatus for achieving an expression approximate to a language used by a skilled operator in identifying the process condition and determining a process operation amount by converting a process condition change pattern into an ambiguous symbol.

A second object of the present invention is to provide a process control system and a control support system, as a technique for building, up a control system for a complicated process. This in turn is capable of performing the function of identifying the conditions almost with such a dexterity as approximate to that of a skilled operator by utilizing the above-mentioned symbolization apparatus.

Another object of the present invention is to provide a process control system and a control support system using the above-mentioned symbolization apparatus. In the above systems, the knowledge of a skilled operator regarding the control and the causal relationship between the process control amounts based on a process structure are utilized to construct a control model maintaining the consistency between different rules.

In order to achieve the first object of the present invention, a symbolization apparatus is provided for converting a process condition of a process making up an object of control, comprising: feature extraction means for extracting a feature amount of a time-series change pattern of the process condition and symbolization means for converting the feature amount produced from the feature extraction means into an ambiguous symbol by the use of a membership function for fuzzy expression determined for each symbol.

In order to achieve the second object of the present invention, a process control system is provided comprising: means for detecting a process condition value of an object process, process condition value memory means for storing the process condition value and the process operation amount detected, symbolization means for converting a change pattern of the present process condition value and process operation amount into a symbolic expression by use of the process condition value and the process operation amount stored in the process condition value memory means, control operation means for determining a process operation amount in order to bring the process condition closer to a target value by use of a symbolic expression produced from the symbolization means, and control output conversion means supplied with the process operation amount determined by the control operation means for producing by converting the process operation amount into a control output to be applied to a process.

In a process control system according to the present invention, a feature amount of a change pattern of a process condition value is extracted and a process change condition is converted into a symbolic expression by the use of the particular feature amount. As a result, it is possible to perform the function of identifying the process condition similar to that of a skilled operator. Also, the control operation means is supplied as an input with a process change condition converted into a symbolic expression and determines a process operation amount. Since the empirical knowhow or knowledge of a skilled operator is expressed in a symbol similar to a language, a control model is built up using a symbolic expression of a process change condition. Therefore, the knowledge of the skilled operator relating to the causal relationship between the process condition amounts or process structure and the like is effectively utilized, thus realizing a control model maintaining a consistency between rules for control.

Further, a control history memory means has stored therein a symbolic expression of a past process condition value and a process operation amount. A parameter learning means uses the past control result stored in the control history memory means to change the parameter for arithmetic operation in the symbolization apparatus and the control operation means. As a consequence, the ambiguity of a symbolic expression used for expressing a condition change pattern of a given process is brought closer to the ambiguity of a liguistic expression by a skilled operator, thereby performing the function of identifying the process condition for arithmetic operation of the process operation amount similar to that of a skilled operator.

BRIEF DESCRIPTION OF THE DRAWINGS

FIG. 2 is a diagram showing a block configuration of a symbolization apparatus;

FIGs. 3A to 3C are diagrams for explaining the operation of feature. extraction unit;

FIGS. 4A, 4B, 4C and 4D are diagrams for explaining the operation of the symbolization unit;

FIG. 6 is a diagram for explaining a combination network;

FIG. 7 is a diagram showing an example of the knowledge stored in a knowledge base;

FIG. 16 is a diagram showing the contents of the knowledge base; and

DESCRIPTION OF THE PREFERRED EMBODIMENTS

An embodiment of the present invention will be explained in detail below with reference to the accompanying drawings.

Figure 1:
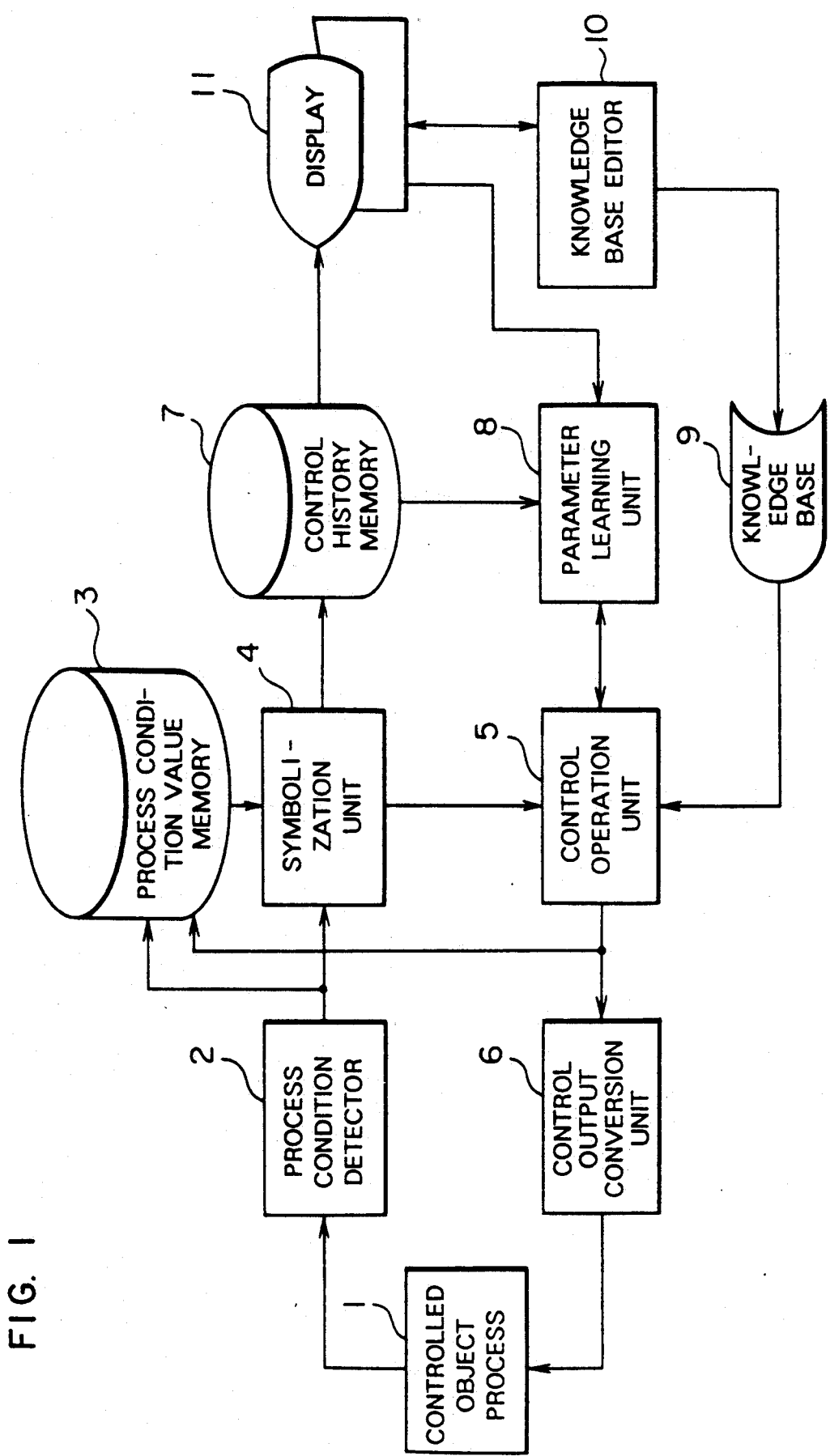
FIG. 1 is a block diagram showing a configuration of a process control system according to an embodiment of the present invention.

FIG. 1 is a diagram showing a block configuration of a process control system according to a first embodiment of the present invention. In FIG. 1, reference numeral 1 designates a process making up an object of control, numeral 2 a process condition detector for detecting the condition amount of the control object process 1 and producing by converting the condition amount into a process condition detection value in a form handled in the process control system, numeral 3 a process condition value memory unit for holding a measurement of the process condition value and the process operation amount for a predetermined length of time, numeral 4 a symbolization apparatus for taking out the process condition value and the process operation amount held in the process condition value memory unit 3 at a predetermined sampling period and converting a process condition change pattern and a change pattern of the process operation amount into a symbolic expression, numeral 5, a control operation unit for determining a process operation amount in order to bring a process condition close to a target value by use of an output of the symbolization apparatus, and numeral 6 a control output conversion unit for converting the process operation amount determined by the control operation unit 5 into a signal for actually driving a process operation terminal and producing the signal for process control. Numeral 7 designates a control history memory unit for storing the process condition value and the process operation amount converted into a symbolic expression as produced from the symbolization apparatus 4, numeral 8 a parameter learning unit for determining a parameter of the symbolization apparatus 4 and the control operation unit 5 by use of the past control history stored in the control history memory unit 7, numeral 9 a knowledge base for storing the knowledge relating to the causal relationship of the process condition value and the process structure, 10 a knowledge base editor for facilitating the addition or change of the knowledge in the knowledge base 9, and 11 a display unit including a CRT or the like for operating the knowledge base editor 10.

The symbolization apparatus 4 converts a process change pattern or a change pattern of the process operation amount into a symbolic expression by a method shown in U.S. application Ser. No. 526,000 filed May 21, 1990, that is, a pattern identification method in which an input pattern is approximated by a polygonal line, is converted into a vector series making up the same line. The vector series is then compared with a vector series of a reference pattern as an object of comparison expressed by a polygonal line to compute the analogy and the scale of reduction between the two, thus making possible a pattern identification including patterns similar in form but having different sizes.

FIG. 2 shows a detail of the above-mentioned symbolization apparatus 4. The symbolization apparatus 4 according to the present embodiment includes a feature extraction unit 21 for extracting, in addition to the features described above, features from a time-series change pattern of the process condition value and the process operation amount and asymbolization unit 24 for converting a feature into an ambiguous symbolic expression by use of a membership function for fuzzy expression. The detailed operation of the apparatus shown in FIG. 2 will be explained below.

Many of the data measured in a process are in time-series form obtained at a predetermined sampling period. A time-series data 20 taken out from the process condition memory 3 shows in FIG. 1 above is expanded into a polynomial corresponding to the particular time-series change pattern by the sum-of-products operation using a feature extraction filter stored in filter memory unit 22. An expansion coefficient 23 of this polynomial is sent to the symbolization unit 24. The symbolization unit 24 takes out a membership function corresponding to the time-series data under processing from the membership function memory unit 25 and produces the particular membership function as a symbolic data 26 expressed by fuzzy logic.

Now, the operation of the feature extraction unit 21 shown in FIG. 2 will be explained with reference to FIGS. 3A to 3C. FIG. 3A is a diagram showing an example of time-series data, and FIG. 3B is a diagram showing an example of the filter for extracting features. An expansion coefficient 23 obtained by causing the time-series data shown in FIG. 3A to act on the filter shown in FIG. 3B is shown in FIG. 3C. In this example, the zero-order expansion coefficient due to the zero-order filter 31 shown in FIG. 3B is 4.0, the primary expansion coefficient due to the primary filter 32 is 0.5, and the secondary expansion coefficient due to the secondary filter 33 is 0.3.

FIGS. 4A to 4D are diagrams showing examples of the operation of the symbolization unit 24 in FIG. 2. FIG. 4A shows an example of the membership function against the zero-order expansion coefficient, and FIG. 4B an example of a two-dimensional membership function against the primary and secondary expansion coefficients. FIG. 4C, on the other hand, shows the result of symbolization using the membership functions shown in FIGS. 4A and 4B. In FIG. 4A, numerals 41, 42 and 43 designate membership functions against symbols indicating "low", "medium" and "high" respectively.

The expansion coefficient due to the zero-order filter 31 for the time-series shown in FIG. 3A is 4.0. From the value of the membership function for an arrow 44 in FIG. 4A, a figure of 0.8 is obtained for "medium" and 0.2 for "low" as an adaptation of symbolic expression. FIG. 4B shows a value of membership function expressed by contour lines as an example of the values of membership function. The numerals 45, 46 and 47, for instance, represent membership functions for symbols meaning "down", "balanced" and "up" respectively. The section A—A' has a form analogous to FIG. 4A. Also, the expansion coefficients due to the primary filter 32 and the secondary filter 33 for the time-series data shown in FIG. 3A are 0.5 and 0.3 respectively. From the value of the membership function for the "x" mark designated by 48 in FIG. 4B, the adaptation of symbolic expression in this case is given as 0.5 for "up", 0.2 for "balanced" and 0.3 for "up from balanced state". In this way, the symbolization apparatus 4 shown in FIG. 2 produces a process condition value as a time-series data in the from of various combinations of adaptation between the ambiguous symbols representing "high", "medium" and "low" indicating the level of a process on the one hand and ambiguous symbols of "up", "balanced", etc. meaning a process change condition on the other hand.

Figure 5:
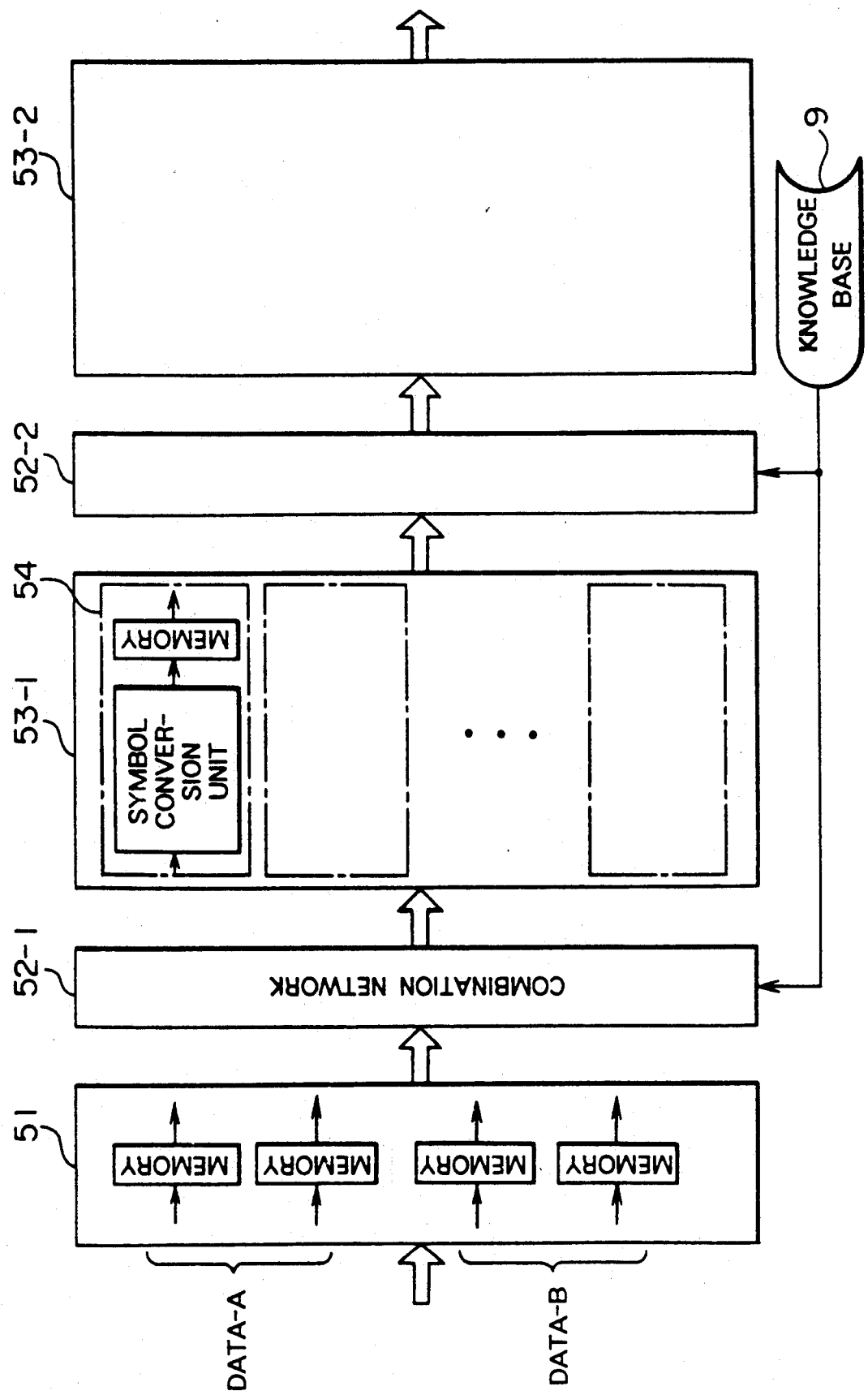
FIG. 5 is a diagram showing a block configuration of the control operation unit.

The control operation unit 5 shown in FIG. 1 has the function of converting the symbolic expression produced from the symbolization apparatus 4 into a new symbolic expression. FIG. 5 is a block diagram showing a configuration of the control operation unit 5. In FIG. 5, numeral 51 designates a memory circuit for holding the adaptation of symbolic expression sent from the symbolization apparatus 4, numeral 52 a combining network for combining and producing the desired combination of symbol adaptations stored in the memory circuit 51, and numeral 53 a symbol conversion circuit for converting a given set of symbols into a new symbol. FIG. 5 shows a case in which the combining network 52 and the symbol conversion circuit 53 are coupled in two stages. This may be replaced by a given number of stages as required.

A detailed configuration of the combining network 52 is shown in FIG. 6. The combining network 52, which is an arrangement of memories 61, is for connecting the memory circuit 51 and the symbol conversion circuit 53 on the basis of the knowledge relating to the causal relationship between the process structure and the data stored in the knowledge base 9.

Assume that the knowledge as shown in FIG. 7, for example, is stored in the knowledge base 9. Specifically, suppose that the fact that "the data X is determined by the data A and B" is given empirically according to the knowledge of the causal relationship or the fact that "the data A is proceeding 'up' so that the operation amount is 'increased' if the data B is 'high'" according to the control knowledge.

In this case, of all the memories 61 shown in FIG. 6, those marked with a black solid circle are connected with the network coupling coefficient of 1.0, while the other memories have a coupling coefficient of 0.0. Through this combining network 52, the sets of symbols held in the memory 51 in accordance with the knowledge stored in the knowledge base 9 are applied as an input to the symbol conversion circuit 53. The combining network 52 may of course be realized as software having similar functions instead of as hardware as shown in FIG. 6.

Figure 8:
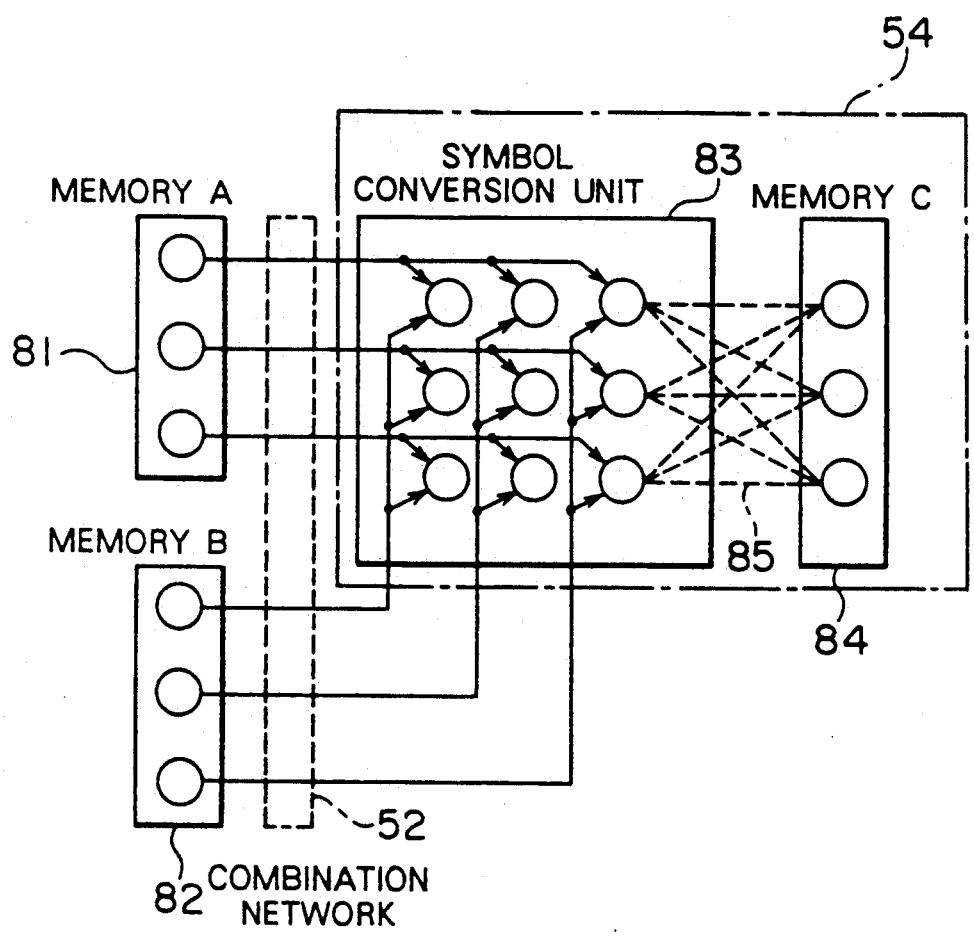
FIG. 8 is a diagram for explaining the configuration of a symbol conversion circuit.

FIG. 8 is a diagram for explaining an example of the symbol conversion element 54 of the symbol conversion circuit 53 in detail. The symbol conversion unit 83 is an arrangement of multi-dimensional memory elements, which is shown as two-dimensional elements for facilitating the understanding in the case of FIG. 8. Numerals 81 and 82 designate memories for holding the adaptation of the symbolic expression of different events respectively. The lateral elements of the symbol conversion unit 83 receive an input from the memories representing the same symbol as in the memory (A)81. In similar fashion, the longitudinal elements are adapted to receive an input from memories representing the same symbols as in the memory (B)82. Each element of the memory (C)84 is coupled to all the elements of the symbol conversion unit 83. Each element of the symbol conversion unit 83 which has received an input from the memories (A)81 and (B)82 has a predetermined output distribution in accordance with the input condition.

In accordance with this output distribution, the output condition of each element of the memory (C)84 is determined. Specifically, assuming that the input to the j-th element of the symbol conversion unit 83 is $x_i$ ($i = 1, 2, \ldots, n_i$), the output of the j-th element is $x_j$, and the output of the k-th element is of the memory 84 is $x_k$, then the equations shown below are obtained.

$$x_j = f\left( \sum_{i=1}^{n_i} x_i \right) \quad (1)$$

$$x_k = f\left( \sum_{j=1}^{n_j} w_j x_j \right) \quad (2)$$

where $w_j$ is a coupling weight parameter, and f an input-/output conversion function which may use, for example, the sigmoid function given as $$f(x) = \frac{1}{1 + \exp(-x)} \quad (3)$$

Turning to FIG. 1, the parameter learning unit 8 updates the coupling parameter of the internal coupling 85 of the symbol conversion element 54 by use of the data stored in the control history memory unit 7 for storing the symbolized control history. In a method of updating the coupling parameter, a symbolized condition value of the data on the past operation stored in the control history memory unit 7 is applied as an input to the control operation unit 5, while implementing the well-known Error Back Propagation Method on using an error between a symbolically expressed operation amount obtained as an output and a symbolized operation amount of the data on the past operation providing a teacher signal.

Figure 9:
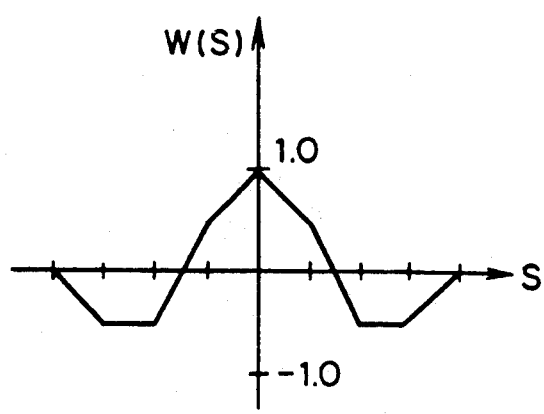
FIG. 9 is a diagram for explaining the lateral inhibition coupling in the parameter learning unit.

Each unit of the memory (C)84 of the symbol conversion element 54 represents a symbol expressed by fuzzy logic of the condition of the same event respectively and may be equipped with a characteristic like the adaptation of a membership function. Specifically, the output of each memory unit is normalized by the total sum of the outputs of the memory units in such a manner that the total sum of the adaptations of the symbols for the same event is 1.0. Further, if the ambiguity of symbolic expression is to be reduced, a lateral inhibition coupling is inserted between the memory units. In other words, if $x_i$ ($i = 1, 2, \ldots, n$) is a symbolic expression for the same event, the event is capable of being decided clearly by realizing the relationship $$x_i = \sum_{j=i-s}^{i+s} w_s x_s \quad (4)$$

where $w_s$ is a parameter indicating the coupling weight and has a form as shown in FIG. 9, for example.

A lateral inhibition coupling similar to the one shown by equation (4) may be inserted also for the symbolic expression shown as a multi-dimensional spatial position.

As a method of heuristic learning, a coupling parameter between symbols is given under a coupled state of the combining network 52 based on the knowledge stored in the knowledge base 9 by learning according to the method mentioned above, after which the data stored in the control history memory unit 7 is applied as an input, while at the same time searching for a symbol having a large adaptation. After that, a coupling is provided anew between the particular symbol sets, thereby heuristically acquiring a new knowledge and control rule. The data in relation to which the past condition values stored in the control history memory unit 7 are similar to the operation amount produced from the control operation unit 5 are classified and extracted, and the mean value, variance, etc. of the adaptation of each symbol are determined. Then a symbol set having a large mean value of adaptation and a small variance is searched for, whereby the causal relationship between a process condition value not stored in the knowledge base 9 and an operation amount is automatically extracted, registered as a control knowledge and thus utilized. As a result, not only the knowledge and experiences of a skilled operator are capable of being automatically extracted, but also a contradiction between control knowledges may be discovered.

Figure 10:
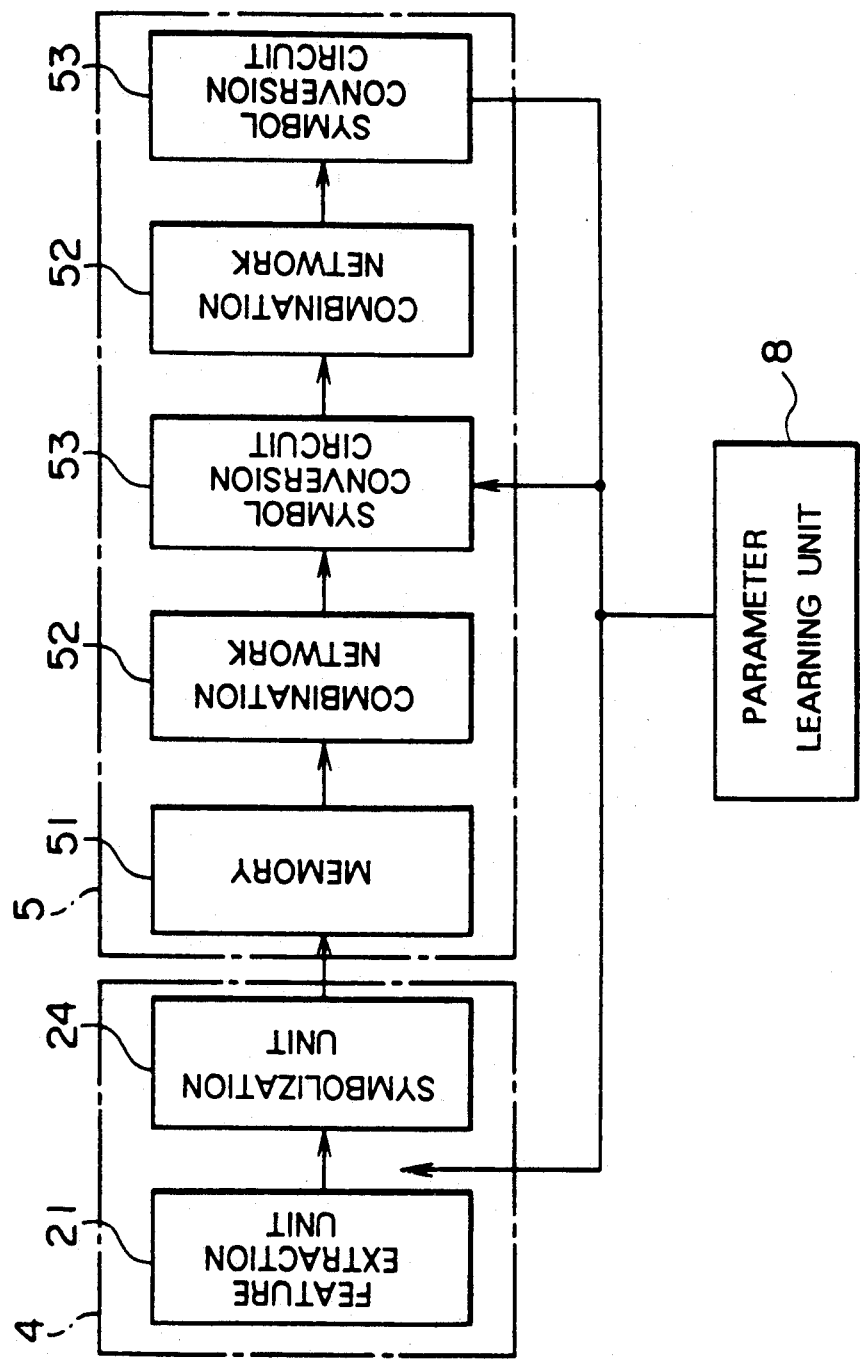
FIG. 10 is a diagram showing an example of the configuration of the parameter learing unit.

Apart from the method of learning described above which is for learning a coupling parameter of an internal coupling of the symbol conversion circuit 53, it is possible to use the contents stored in the control history memory unit 7 as a measured time-series numerical data in other cases. In such cases, as shown in FIG. 10, the processing operations at the symbolization unit 4 and the control operation circuit 5 are integrated, so that both the coupling parameter of the internal coupling 85 of the control operation unit 5 and the membership function of the symbolization unit 4 are capable of being learned at the same time in the process of learning by the parameter learning unit 8. As a result, it is possible to make the ambiguity of the symbol for expressing the process condition value approximate to that of the language for expressing the knowledge held by a skilled operator, thereby further improving the function of identifying the process condition.

The relationship between the operations of the various parts in the above-mentioned embodiment will be explained below with reference to the designing stage of the control system and the implementation of the control operation.

First, in the designing stage of the control system, the operations (1) to (3) described below are performed.

(1) The knowledge relating to the control object process 1 is applied to the knowledge base 9 in dialogue fashion by use of the knowledge base editor 10 from the display unit 11.

(2) The coupling coefficient of the combining network 52 of the control operation unit 5 is set on the basis of the knowledge stored in the knowledge base 9.

(3) By use of the control history stored in the control history memory unit 7, the coupling parameter of the internal coupling 85 of the control operation unit 5 is learned by the parameter learning unit 8.

It is also possible to repeat the operations (1) to (3) above by comparing the output of the operation amount of the control operation unit 5 after execution of the operations specified in (1) to (3) with the operation amount stored in the control history memory unit 7, and adding or correcting the data in the knowledge base 9.

As a method of storing data in the control history memory unit 7, the data on the past processes, if held as a process condition value, may be stored through the symbolization apparatus 4, or the operation data before utilizing the control operation unit 5 according to the present invention for control purposes, as symbolized through the symbolization apparatus 4, may be stored.

In executing the control operation, on the other hand, the operations described in (4) to (7) below are repeated at a predetermined period.

(4) The process condition of the control object process 1 is detected by the process condition detector 2. The present process condition value detected and the data read out of the process condition memory unit 3 at a predetermined sampling period are sent to the symbolization apparatus 4.

(5) The process condition value and the operation amount symbolized by the symbolization apparatus 4 are sent to the control operation unit 5 on the one hand and stored in the control history memory unit 7 on the other hand.

(6) The control operation unit 5, by use of a symbolized process condition value supplied from the symbolization apparatus 4, computes the process operation amount by a control model expressed by an internal coupling parameter and applies the same to the control output conversion unit 6.

(7) The control output conversion unit 6 converts the process operation amount supplied thereto from the control operation unit 5 into a signal for driving an actual process operation terminal and applies the same to the operation terminal of the control object process 1.

As described above, according to the embodiment mentioned above, the process operation amount is capable of being computed by use of an ambiguous symbol held by a skilled operator on the one hand, while at the same time utilizing the accumulated knowledge and experiences on the other hand. This makes it possible to construct a process control model approximate to a skilled operator.

A specific example relating to the abovementioned embodiment will be described. The specific example shown below, as seen from FIG. 15, represents a pump quantity control system.

Figure 15:
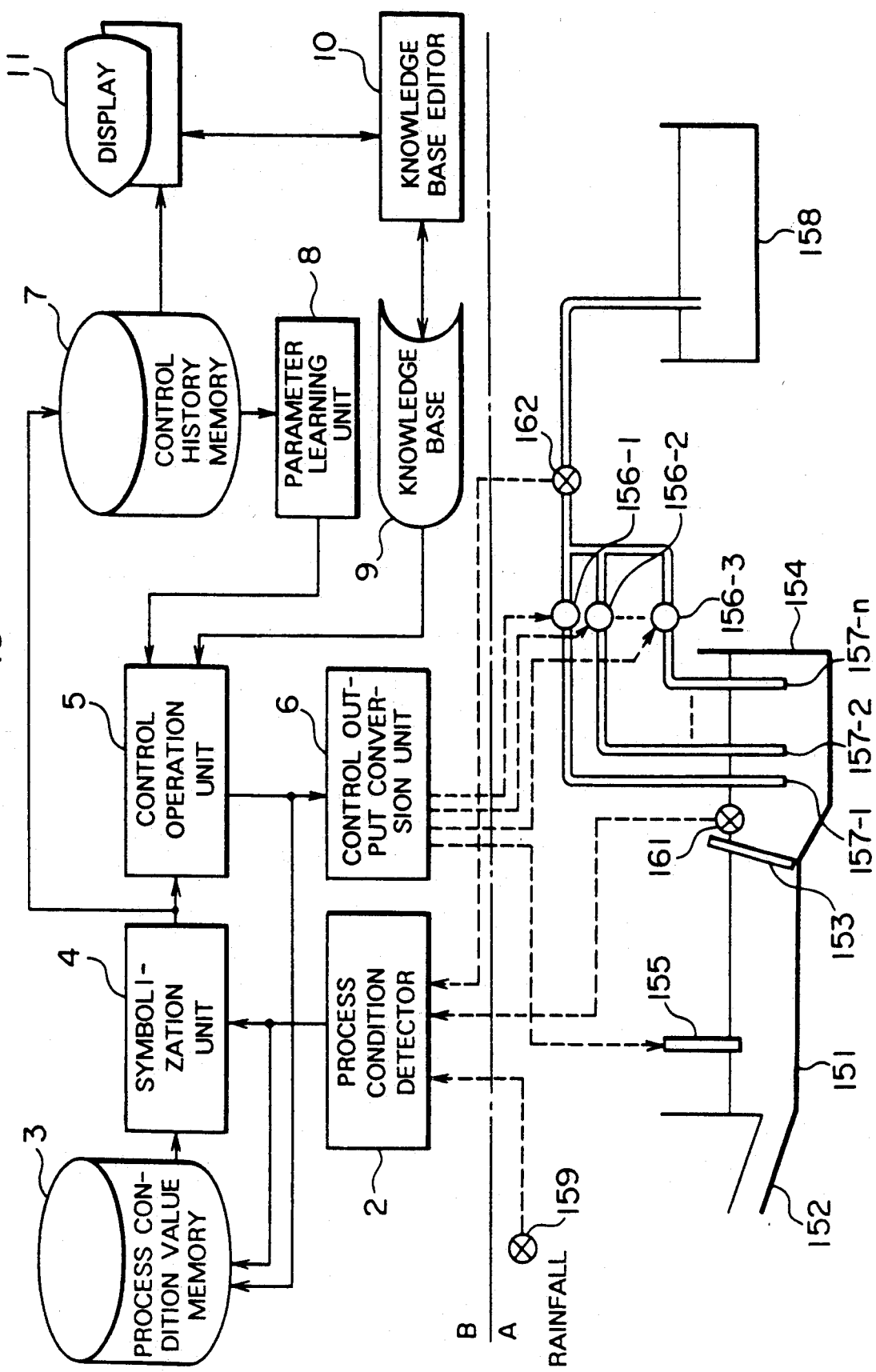
FIG. 15 is a diagram showing an example of the configuration of the number-of-pumps or pump quantity control system as a specific application of an embodiment of the present invention.

In FIG. 15, reference character A designates a sewage disposal process, and character B a pump quantity control system for the sewage disposal process A. A and basin 151 is provided including a conduit 152 buried in the ground and a pump well 154 integrally built, through a screen 153. A water check door 155 acts as a gate for protecting the pump equipment from innundation in the case where a large amount of water flows in from the conduit 152 and the water level of the pump well 154 rises. The sewage water that has flowed in from the conduit 152, that is, the general waste water and rain water including the underground water are caused to flow into the pump well 154 through the water check door 155 and a screen 153 from the sand basin 151.

The pump well 154 has suction tubes 157-1 to 157-n arranged therein by penetration and connected with pumps 156-1 to 156-n. The pipes on the discharge side of the pumps 156-1 to 156-n are connected to each other on the one hand and to the waste water disposal equipment 158 on the other hand.

In the sewage drainage process configured as described above, the discharge is regulated in stages by changing the combination of pumps in operation or continuously by controlling the opening of a discharge valve or partial speed control. As described above, however, the sewage includes general waste water, rain water and underground water. The weekly or daily volume of general waste water is steady to some extent in time-series change, but the rain water and underground water change varies depending upon the locality and weather condition thus making it difficult to forecast the volume of influx thereof.

Normally, the operation of the pump 156 and the water check gate 155 is controlled in accordance with direct correspondence between the total discharge flow rate of the pumps and the water level of the pump well. In this method of operation control, it may be difficult to cope with a great influx change and the resulting sharp change in the pump well water level, thereby making an unmanned pump operation difficult. Also, due to the low reproducibility of the influx rate, a skilled operator is required for controlling the operation of the pumps. In addition, the sense of responsibility for protecting the town from innundation causes addition on the tension the worker in performing his job.

In order to control the waste water disposal process system A, the pump quantity control system B according to the above-mentioned embodiment is configured in the manner described below. Specifically, the system comprises a process condition detector 2, through which a rainfall meter measurement signal 159, a pump well water level detection signal 161 and a discharge flow rate detection signal 162 are applied to the symbolization apparatus 4 and a process condition value memory unit 3. The symboization apparatus 4 symbolizes and produces a change pattern of each process condition by use of the present process condition value and the past process condition value stored in the process condition value memory unit 3 and taken out at an appropriate sampling period.

Figure 17:
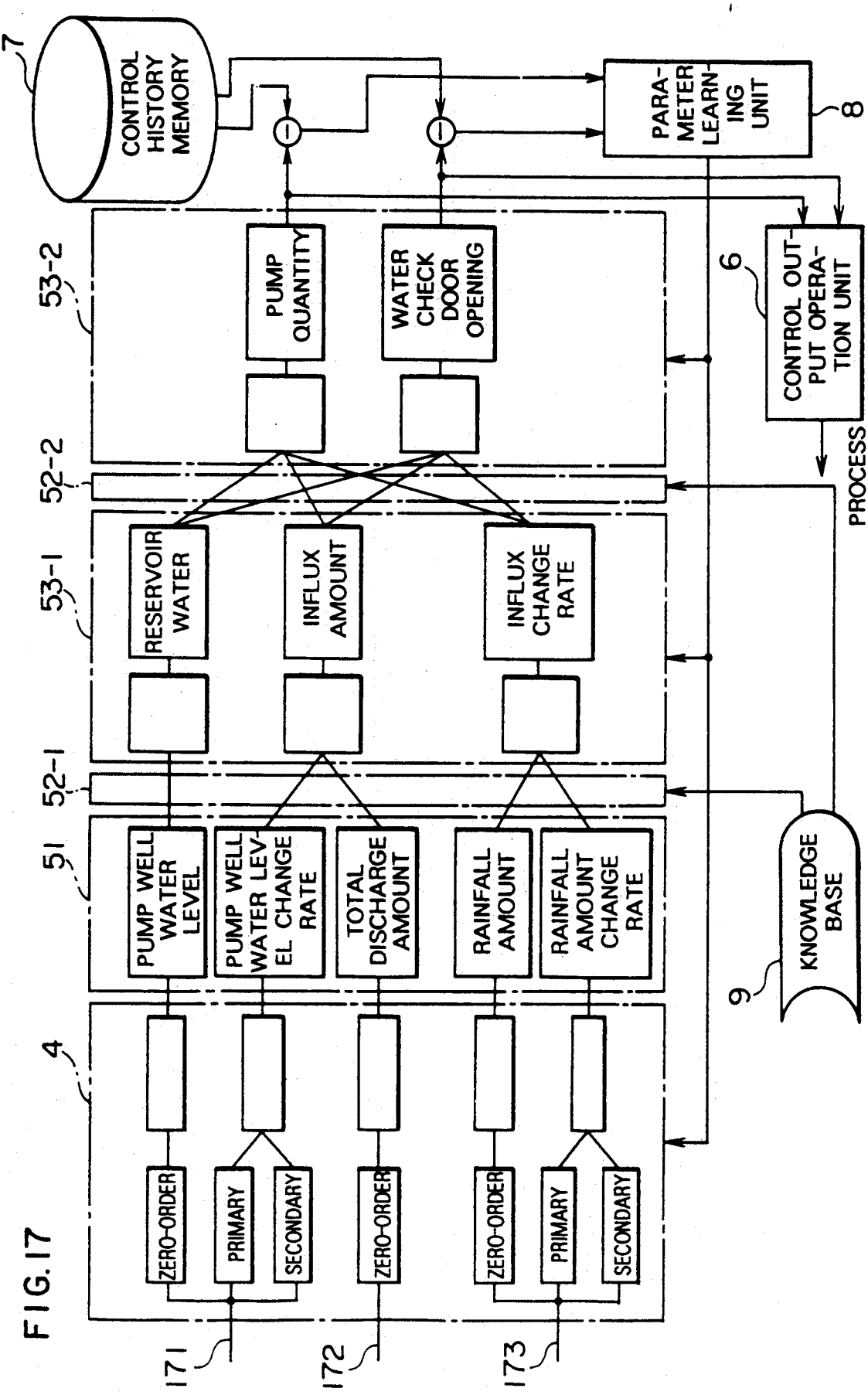
FIG. 17 is a diagram showing the control operation unit in the number-of-pumps control system.

As shown in FIG. 17, when the time-series data 171 of the pump well water level is expanded into a polynomial, the pump well water level is expressed from the zero-order term and the well water level change rate from the primary- and secondary-terms respectively as an ambiguous symbol, and are stored in the memory circuit 51 of the control operation unit 5. In similar fashion, when the time-series data of the total discharge 172 is expanded into a polynomial, the ambiguous symbol of rainfall from the zero-order term and that of the rainfall change rate from the primary and secondary terms respectively are stored in the memory circuit 51.

The knowledge on the causal relation due to the process structure applied from the display means 11 by use of the knowledge base editor 10 and the control knowledge obtained by experiences are stored in the knowledge base 9. FIG. 16 shows an example of the knowledge stored in the knowledge base 9. By using these knowledge, the coupling coefficient of the combining networks 52-1 and 52-2 of the control operation unit 5 is determined. FIG. 17 shows an exemplary coupling condition.

In FIG. 16 indicates that a causal relation exists between the pump well water level and the water storage capacity due to the causal knowledge (1), between either the pump well water level change rate or the total discharge and the rate of influx by the causal knowledge (2), and between either the rainfall or the rainfall change rate and the influx rate change rate due to the causal knowledge (3) and (4). These relations define the coupling coefficient of the combining network 52-1 shown in FIG. 17. Also, it is seen from FIG. 16 that there is a causal relation between either the water storage capacity, influx rate or influx rate change rate and the number of pumps, that is, pump quantity due to the control knowledge (1) and (2), and between either the water storage capacity, influx rate or influx rate change rate and the degree of opening of the water check door 155 due to the control knowledge (3) and (4), respectively. These relationships define the coupling coefficient of the combining network 52-2 shown in FIG. 17.

At the time of designing the control system, each process condition value stored in the control history memory unit 7 is sequentially addressed and stored in the memory circuit 51. The parameter learning unit 8 changes the coupling parameter of the symbol conversion circuits 53-1 and 53-2 by learning in accordance with a teacher signal making up an error between the operation amount resulting from the computation through the symbol conversion circuits 53-1 and 53-2 and the past operation amount stored in the control history memory unit 7.

In the case where the past condition value is numerically stored in the control history memory unit 7, the membership function of the symbolization apparatus 4 and the coupling parameter of the symbol conversion circuits 53-1 and 53-2 are capable of being learned at the same time by the parameter learning unit 8 in accordance with a teacher error between the operation amount obtained from an output produced in response to each condition value applied as an input to the symbolization apparatus 4 and the operation amount stored in the control history memory unit 7.

At the time of executing the control operation, the operation amount is determined by the coupling parameter of the control operation unit 5 obtained by learning through the use of the data stored in the memory circuit 51 providing an output of the symbolization apparatus 4, thereby effecting the process control.

According to the present embodiment, the knowledge of the operator expressed in ambiguous symbols and the control history are capable of being utilized effectively as a knowledge for determining a process operation amount. It is thus possible to easily realize a process control system having a capability similar to that of a skilled operator.

Now, a system for generating a process model as an application of the above-mentioned process control system will be explained.

Figure 11:
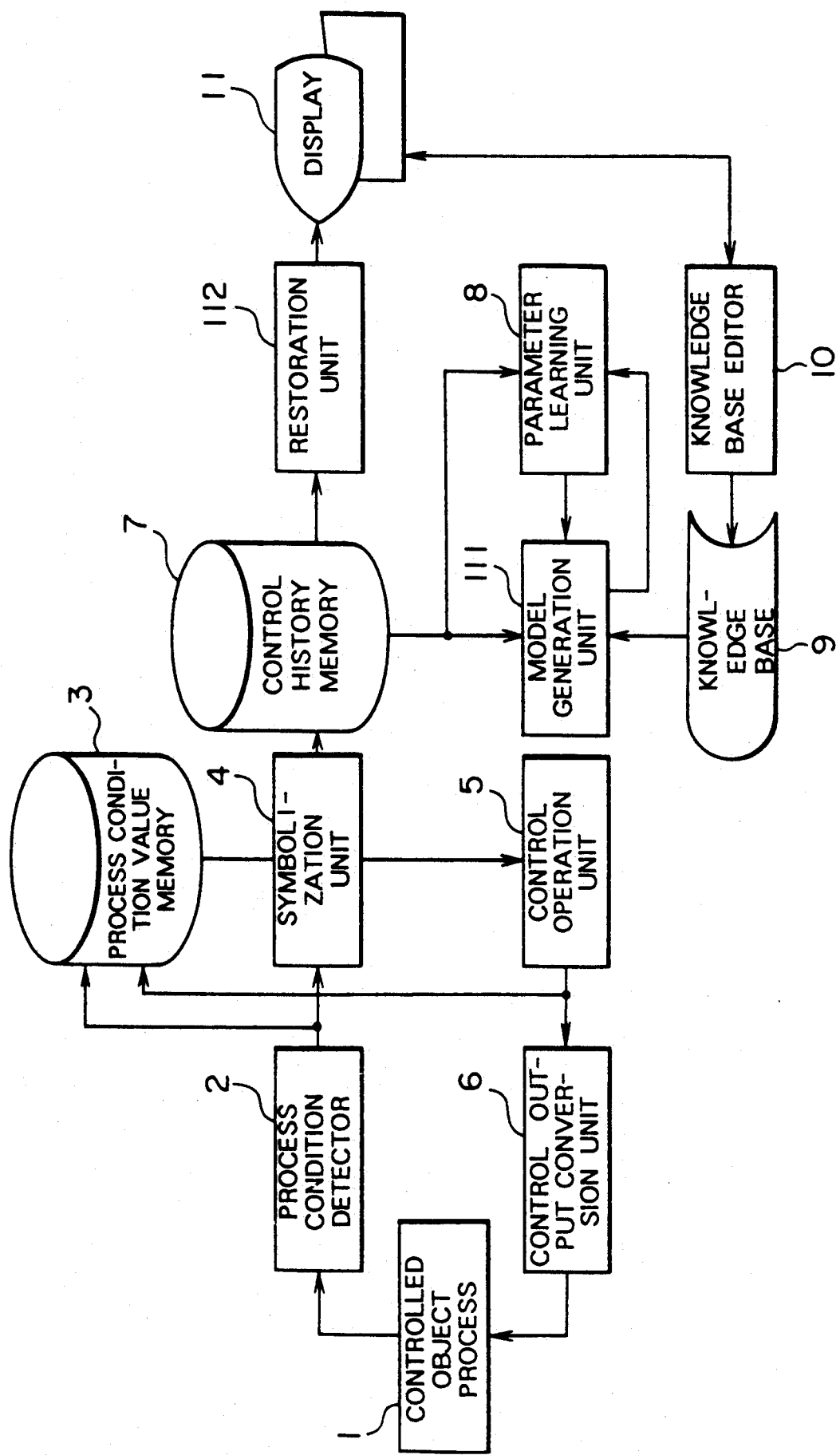
FIG. 11 is a diagram showing an example of the configuration of the process model generation system according to an embodiment of the invention.

FIG. 11 is a diagram showing a block configuration of a process model generation system according to the present embodiment. In FIG. 11, a process 1 to be controlled, a process condition detector 2, a process condition memory unit 3, a symbolization apparatus 4, a control operation unit 5, a control output conversion unit 6, a control history memory unit 7, a parameter learning unit 8, a knowledge base 9, a knowledge base editor 10 and a display unit 11 are adapted to operate in the same manner as the corresponding component elements shown in FIG. 1 with reference to the previous embodiment. A restoration unit 112 has the function of restoring as a time-series data the symbolized process condition value stored in the control history memory unit 7 and displaying it on the display unit 11. The model generation unit 111, on the other hand, has basically the same configuration as the control operation unit 5 shown in FIG. 5 and has the function of expressing a model of the basic process as an internal combining network in coupled condition by use of the knowledge relating to the causal relation of the process stored in the knowledge base. The parameter learning unit 8 compares the condition change output of the process model generation unit 111 against the past symbolized process operation amount and the process condition amount stored in the control history memory unit 7 with the actual condition change stored in the control history memory unit 7 to change the coupling parameter of the internal coupling 85 of the model generation unit 111 by the above-mentioned learning method. The present embodiment has an advantage in that the process model using the past operation data is capable of being automatically generated.

Now, explanation will be made about a system for automatically generating an optimum operation knowledge used for application of the above-mentioned process control system with reference to FIG. 12.

Figure 12:
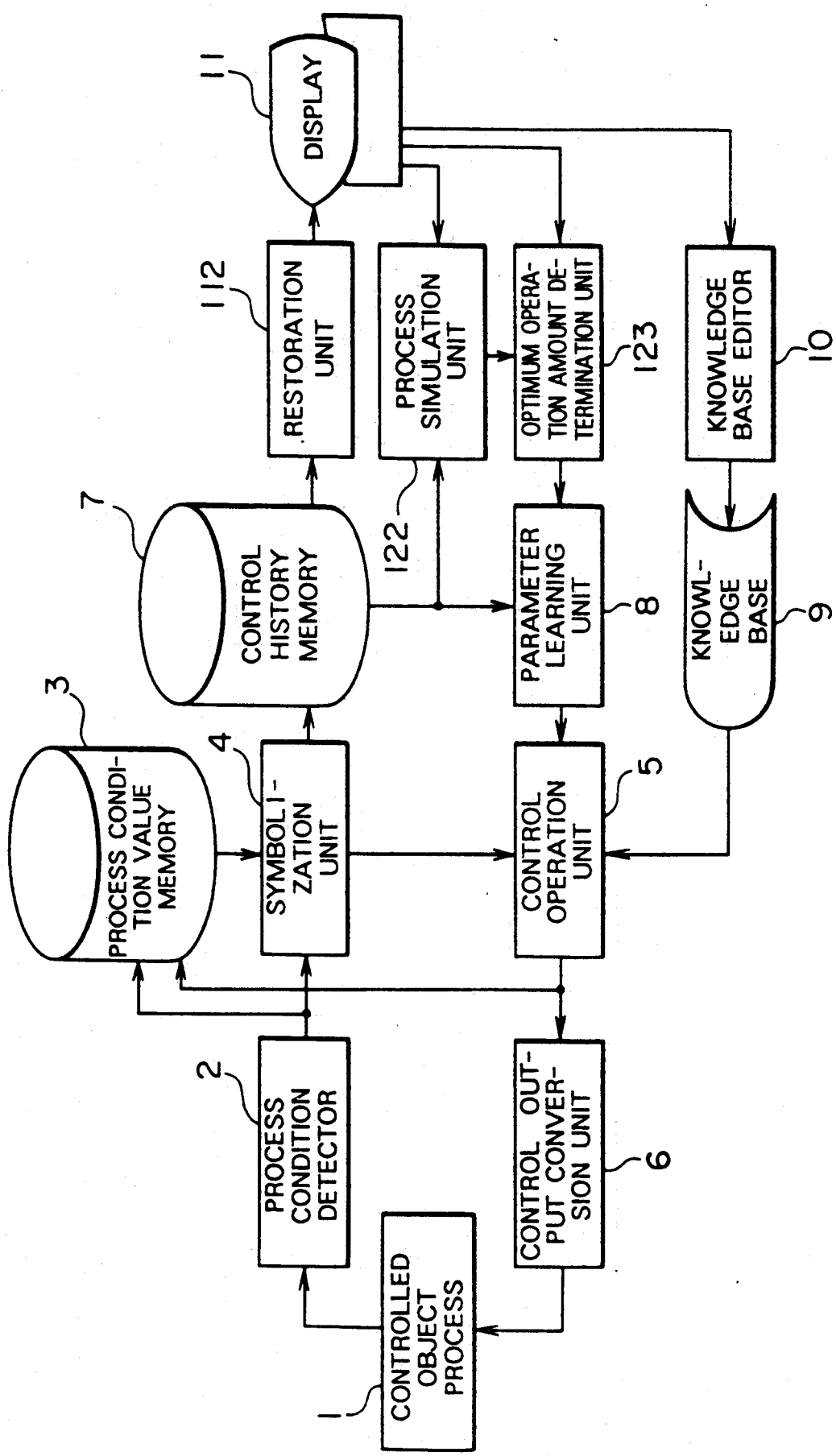
FIG. 12 is a diagram showing an example of the configuration of the optimum process operation amount determining system according to an embodiment of the invention.

FIG. 12 is a diagram showing a block configuration of an automatic optimum operation knowledge generation system according to the present embodiment. In FIG. 12, an object process 1 to be controlled, a process condition detector 2, process condition value memory unit 3, a symbolization apparatus 4, control operation unit 5, control output conversion unit 6, control history memory unit 7, parameter learning unit 8, a knowledge base 9, a knowledge base editor 10 and display unit 11 operate in the same manner as the corresponding component elements respectively shown in FIG. 1 with reference to the preceding embodiment. Restoration unit 112 has the function of restoring as a time-series data the process condition value symbolized and accumulated in the control history memory unit 7 and displaying the same on the display unit 11. Process simulation unit 122 is for executing a simulation of the change in process condition by use of a symbolized process condition value and a process model stored in the control history memory unit 7. Optimum operation amount determining unit 123 is for determining an optimum operation amount by use of the result of simulation by the process simulation unit 122 and the target condition of the process supplied from the display unit 11. Compared with the above-mentioned first embodiment in which the operation amount as a teacher signal of the parameter learning unit 8 is a history of the past operation, the present embodiment is considerably different in the use of the optimum operation amount providing an output signal of the optimum operation amount determining unit 123.

According to the present embodiment, the relationship between the process condition value and the optimum operation amount is capable of being generated automatically as a coupling parameter in the control operation unit 5 by use of the operation history stored.

Now, process operation training system for application of the above-mentioned process control system will be explained with reference to FIG. 13.

Figure 13:
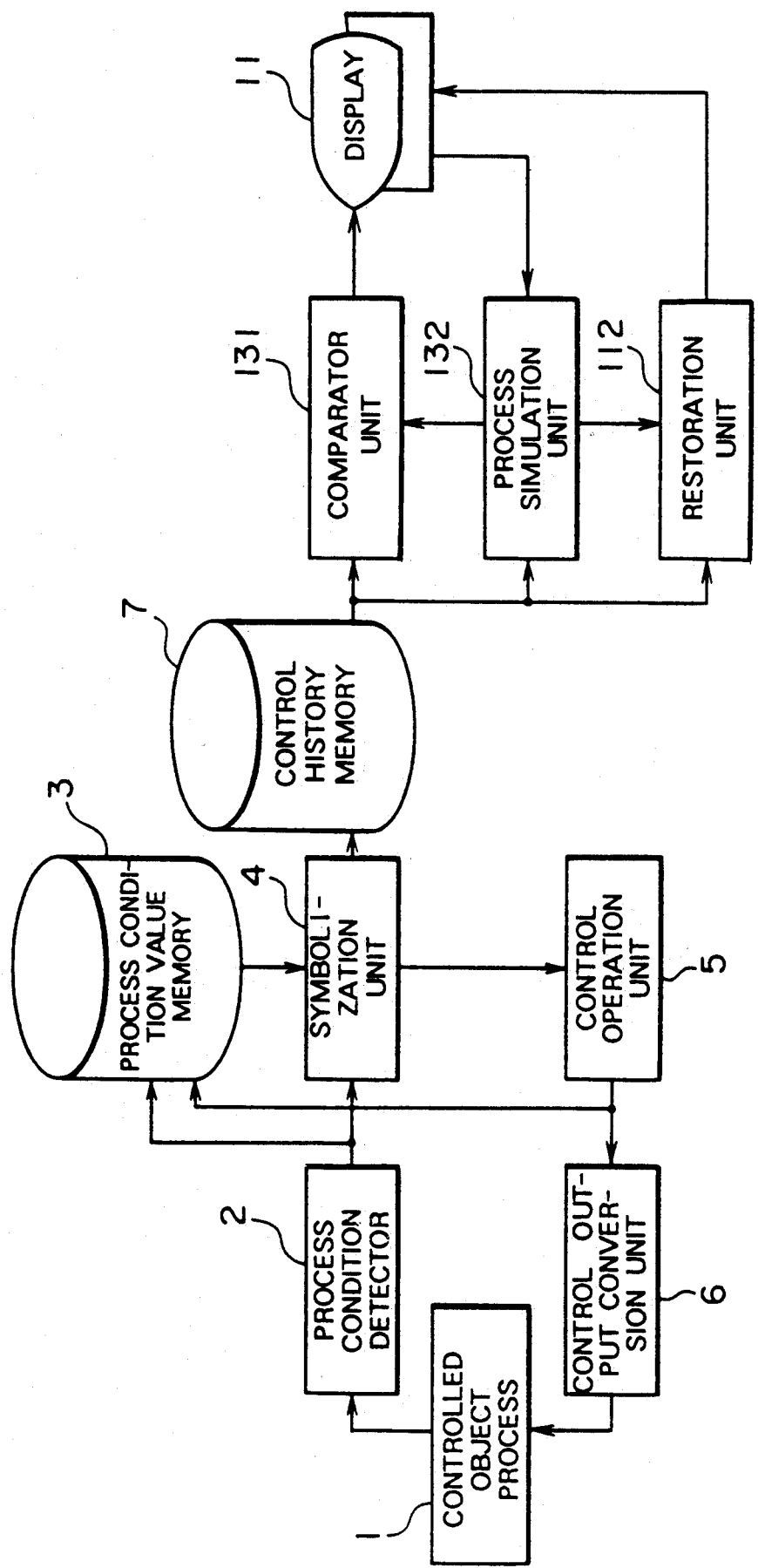
FIG. 13 is a diagram showing an example of the configuration of the process operation training system according to an embodiment of the invention.

FIG. 13 is a diagram showing a block configuration of the process operation training system according to the present embodiment. FIG. 13 comprises an object process 1 to be controlled, a process condition detector 2, a process condition value memory means 3, a symbolization apparatus 4, a control operation unit 5, a control output conversion unit 6, a control history memory unit 7, a parameter learning unit 8, a knowledge base 9, a knowledge base editor 10 and a display unit 11 adapted to operate in the same manner as the corresponding component parts of the previous embodiment shown in FIG. 1 respectively. Restoration unit 112 has the function identical to that shown in FIG. 11. Also, process simulation unit 132 is supplied as an input with a process operation amount due to a trainee from the display unit 11 for producing a process condition change based on an internal process model. Comparator 131 compares a change in the process condition value and the actual operation amount stored in the control history memory unit 7 with the result of operation by the trainee and applies the result of the comparison to the display unit 11.

According to the present embodiment, it is possible to train a process operator by the use of an accumulated operation history.

Now, a process operation support system providing an application of the process control sytem described above will be explained with reference to FIG. 14.

Figure 14:
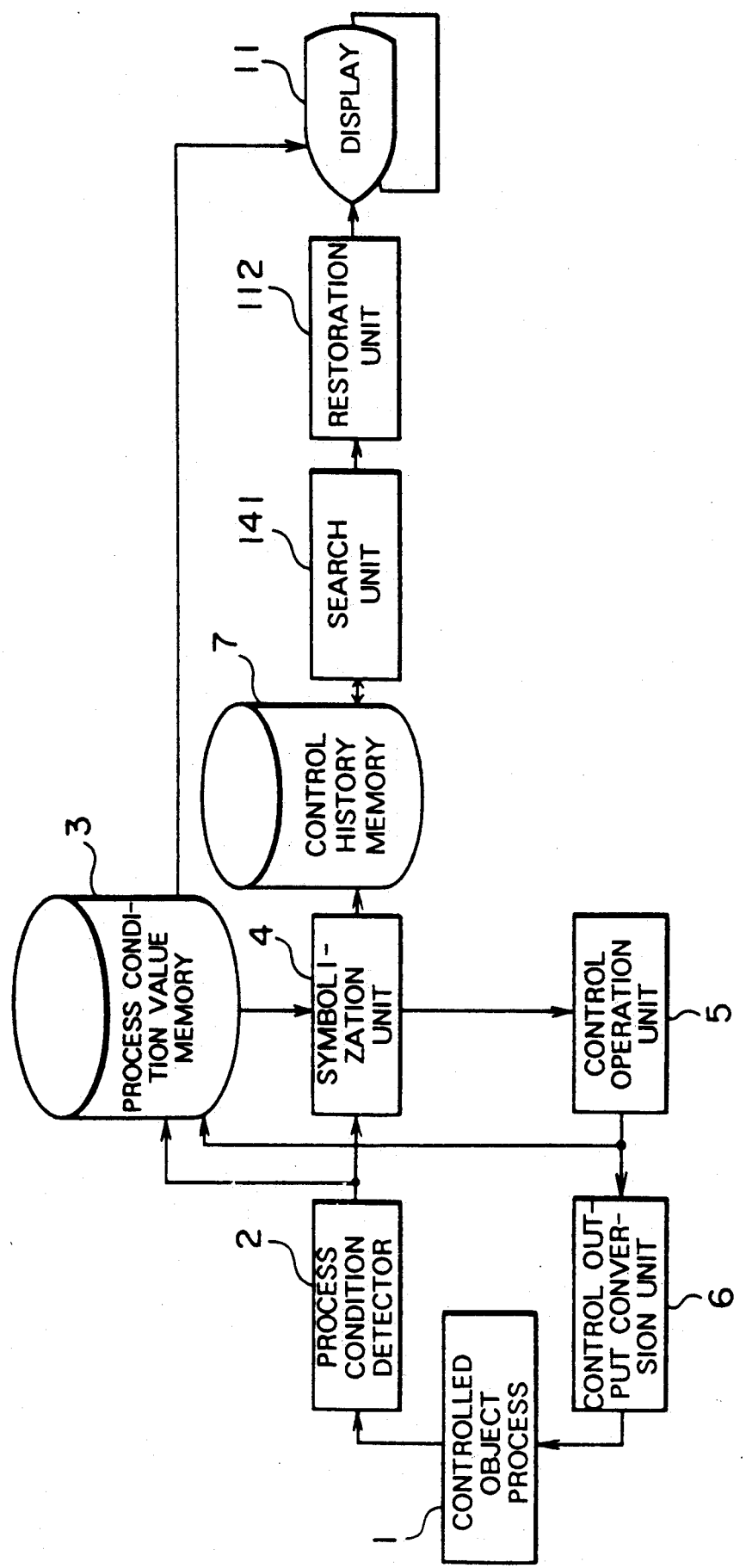
FIG. 14 is a diagram showing an example of the configuration of the process opertion support system according to an embodiment of the present invention.

FIG. 14 is a diagram showing a block configuration of a process operation support system according to the present embodiment. FIG. 14 comprises an object process 1 to be controlled, a process condition detector 2, a process condition value memory unit 3, a symbolization unit 4, a control operation unit 5, a control output conversion unit 6, a control history memory unit 7 and a display unit 11 adapted for operating in the same manner as the corresponding component parts of the embodiment shown above in FIG. 1. Also, search unit 141 has the function that the past process condition value and process operation amount closest to the process condition symbolized presently by the symbolization apparatus 4 are searched for from the past result of operation accumulated in the control history memory unit 7 and applied to the restoration unit 112. The restoration unit 112, which has the same function as the corresponding component part shown in FIG. 11, operates in such a manner that a change in the symbolized process condition value applied thereto from the search unit 141 is restored into a time-series change pattern and applied to the display unit 11. The display unit 11, on the other hand, displays the change pattern of the present process condition stored in the process condition value memory unit 3.

According to the present embodiment, the accumulated operation history and the present process condition are capable of being compared with each other and displayed to the process operator while supplying him with the past operation amount and the operation result as important control information at the same time.

Each of the application systems shown in FIGS. 11 to 14 supplies effective means for supporting the process control. Each embodiment shown above is only an example of the present invention, and the present invention is not limited to such embodiments.

It will thus be understood from the foregoing detailed description that according to the present invention, a symbolization apparatus is realized in which an expression approximate to that used by a skilled operator is made possible by converting a change pattern of a process condition into an ambiguous symbol on the one hand, and a process control system is obtained which is capable of performing a decision function approximate to that owned by a skilled operator on the other hand. Further, the present invention has the advantages that:

(1) A time-series condition change pattern of the process measurement information which has thus far been incapable of direct measurement becomes available as important information for discriminating the process information.

(2) The interference between variables and the limitation of numerical operation in a multi-variable model which have thus far posed an information bottleneck in building a process model become usable by converting the condition of the variables into an abstract expression of symbols or the like.

(3) By effecting a process control model by the use of a symbolic expression, it becomes possible to build a control model utilizing the knowledge and knowhow of a skilled operator or the causal relation between the variables determined from a process structure, so that the knowledge and experiences transcending the power of expression of a skilled operator are capable of being extracted and utilized completely in a form maintaining a consistency.

(4) A process measurement data is used by being converted into an ambiguous symbol, whereby the computation of a process operation amount becomes possible using an expression approximate to the language used by a skilled operator for expressing a process condition.

(5) Past process measurement data are accumulated with names of symbolic events attached thereto, whereby high-speed retrieval becomes possible of a past event analogous to an event of a process operation, thus making it possible to supply a criterion for taking an appropriate measure against a fault by reference to the data on a past analogous operation effectively utilizing the accumulated experiences.

We claim:

1. A symbolization apparatus for use in a process control system for producign symbols representing process conditions of a process system, said apparatus comprising:
   means for detecting process conditions of said process system during every moment of operation of said process system;
   memory means for storing said detected process conditions;
   means for sampling said process conditions stored in said memory means and for performing a sum-of-product calculation using feature extraction filters stored in a filter memory unit to obtain values indicating polynomial expansion coefficients; and
   means for transforming said values indicating piolynomial expansion coefficients in said process conditions into symbolic expressions in a form of fuzzy logic expressions indicating qualitative process conditions according to a membership function.

2. A process control system for detecting process conditions and producing control values based on said detected process conditions to thereby control a process system in target process conditions, comprising:
   means for detecting process conditions of said process control system during every moment of operation of said process system;

memory means for storing said detected process conditions;

means for sampling said process conditions stored in said memory means and for performing a sum-of-product calculation using fature extraction filters stored in a filter memory unit to obtain values indicating polynomial expansion coefficients;

means for transforming said values indicating polynomial expansion coefficients in said process conditions into symbolic expressions in a form of fuzzy logic expressions indicating qualitative process conditions according to a membership function;

knowledge base means for storing causal relations between said process conditions and process control values;

combination network means for determining a combination of symbolic expressions according to said causal relations stored in said knowledge base means;

symbol conversion means for receiving said combination of symbolic expressions from said combination network means and obtaining a weighted average of said combination of symbolic expressions as process control values using coupling weighting factors; and means for converting said process control values into control signals supplied to said process system.

3. A process control system according to claim 2, further comprising:

means for storing history of said symbolic expressions from said transforming means and said process control values from said symbol conversion means; and parameter learning means for revising said membership function and said coupling weighing factors in said symbol conversion means according to said stored history of said symbolic expressions and said process control values by an error back propagation learning method.

4. A process control system according to claim 3, further comprising:

restoration means for restoring said symbolic expressions indicating qualitative process conditions to a time-series of data of the process in a form of polygonal line;

display means for displaying said time-series of data;

means for inputting a model which expresses the operation of said process system;

means for inputting a target condition of said process system;

simulation means for simulating change of conditions of said process system based on said model; and means for determining optimum control values for achieving an optimum condition of said process system by means of a result of said simulation by said simulation means and inputted said target condition.

5. A process control system for detecting process conditions and producing control values based on said detected process conditions to thereby control a process system in target process conditions, comprising:

means for detecting process conditions of said process control system during every moement of operation of said process system;

memory means for storing said detected process conditions;

means for sampling said process conditions stored in said memory means and for performign a predetermined calculation using sampled process conditions to obtain values indicating levels and trends in said process conditions;

means for transforming said values indicating levels and trends in said process conditions into symbolic expressions indicating qualitative process conditions according to a membership function;

means for determining process control values by selecting process conditions close to desired conditions according to said symbolic expressions indicating qualitative process conditions;

means for converting said process control values into control signals supplied to said process system wherein said determining means comprises:

means for storing said symbolic expressions from said transforming means, knowledge base means for storing causal relations between said process conditions and said process control values, combination network means for determining combinations of said symbolic expressions according to said causal relations stored in said knowledge base means, and symbol conversion means for receiving said combinatinos of said symbolic expressions from said combination network means and for making weighted average of said symbolic expressions as said process control values using coupling weighing factors;

means for storing history of said symbolic expressions from said transforming means and said process cotnrol values from said determining means;

means for correcting said coupling weighing factors in said symbol conversion means according to said stored history of said symbolic expressions and said process control values by means of an error back propagation learning method;

restoration means for restoring said symbolic expressions indicating qualitative process conditions to a time-series of data of the process in a form of polygonal line;

display means for displaying said time-series of data; and model generation means for generating and expressing a model of said process system in a form of connecting state of the combination network by means of said causal relations stored in said knowledge base means, said model generation means having a structure identical to that of said determining means.

6. A process control system for detecting process conditions and producing control values based on said detected process conditions to thereby control a process system in target process conditions, comprising:

means for detecting process conditions of said process control system during every moment of operation of said process system;

memory means for storing said detected process conditions;

means for sampling said process conditions stored in said memory means and for performing a predetermined calculation using sampled process conditions to obtain values indicating levels and trends in said process conditions;

means for transforming said values indicating levels and trends in said process conditions into symbolic expressions indicating qualitative process conditions according to a membership function;

means for determining process control values by selecting process conditions close to desired conditions according to said symbolic expressions indicating qualitative process conditions;

means for converting said process control values into control signals supplied to said process system wherein said determining means comprises:

means for storing said symbolic expressions from said transforming means, knowledge base means for storing causal relations between said process conditions and said process control values, combination network means for determining combinations of said symbolic expressions according to said causal relations stored in said knowledge base means, and symbol conversion means for receiving said combinations of said symbolic expressions from said combination network means and for making weighted average of said symbolic expressions as said process control values using coupling weighing factors;

means for storing history of said symbolic expressions from said transforming means and said process control values from said determining means;

means for correcting said coupling weighing factors in said symbol conversion means according to said stored history of said symbolic expressions and said process control values by means of an error back propagation learning method;

means for inputting process control values by an operator;

simulation means for simulating change of conditions of a simulation model of a process system;

comparator unit for comparing said procesas conditions of said history in said history storing means with the result of said simulatino by said simulation means; and display means for displaying a comparison result from said comparator unit to display said result to said operator.

7. A process control system for detecting process conditions and producing control values based on said detected process conditions to thereby control a process system in target process conditions, comprising:

means for detecting process conditions of said process control system during every moment of operation of said process system;

memory means for storing said detected process conditions;

means for sampling said process conditions stored in said memory means and for performing a predetermined calculation using sampled process conditions to obtain values indicating levels and trends in said process conditions;

means for transforming said values indicating levels and trends in said process conditions into symbolic expressions indicating qualitative process conditions according to a membership function;

means for determining process control values by selecting process conditions close to desired conditions according to said symbolic expressions indicating qualitative process conditions;

means for converting said process control values into control signals supplied to said process system wherein said determining means comprises:

means for storing said symbolic expressions from said transforming means, knowledge base means for storing causal relations between said process conditions and said process control values, combination network means for determining combinations of said symbolic expressions according to said causal relations stored in said knowledge base means, and symbol conversion means for receiving said combinations of said symbolic expressions from said combination network means and for making weighted average of said symbolic expressions as said process control values using coupling weighing factors;

means for storing history of said symbolic expressions from said transforming means and said process control values from said determining means;

means for correcting said coupling weighing factors in said symbol conversion means according to said stored history of said symbolic expressions and said process control values by means of an error back propagation learning method;

searching means for searching for past symbolic expressions of said process conditions and said process control values in said history storing means to extract said symbolic expressions most similar to present symbolic expressions; and restoration means for restoring said symbolic expressions received from said searching means to a time-series of data of the process in a form of polygonal line.

* * * * *